United States Patent
Yoo et al.

(10) Patent No.: US 10,419,779 B2
(45) Date of Patent: Sep. 17, 2019

(54) METHOD AND DEVICE FOR PROCESSING CAMERA PARAMETER IN 3D VIDEO CODING

(71) Applicant: LG ELECTRONICS INC., Seoul (KR)

(72) Inventors: Sunmi Yoo, Seoul (KR); Junghak Nam, Seoul (KR); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 15/111,735

(22) PCT Filed: Sep. 24, 2015

(86) PCT No.: PCT/KR2015/010129
§ 371 (c)(1),
(2) Date: Jul. 14, 2016

(87) PCT Pub. No.: WO2016/056779
PCT Pub. Date: Apr. 14, 2016

(65) Prior Publication Data
US 2016/0337665 A1    Nov. 17, 2016

Related U.S. Application Data

(60) Provisional application No. 62/061,161, filed on Oct. 8, 2014, provisional application No. 62/092,273, filed on Dec. 16, 2014.

(51) Int. Cl.
*H04N 19/597* (2014.01)
*H04N 13/00* (2018.01)
(Continued)

(52) U.S. Cl.
CPC ......... *H04N 19/597* (2014.11); *H04N 13/128* (2018.05); *H04N 13/194* (2018.05);
(Continued)

(58) Field of Classification Search
CPC .. H04N 19/597; H04N 13/194; H04N 13/128; H04N 19/174; H04N 19/172;
(Continued)

(56) References Cited

U.S. PATENT DOCUMENTS

| | | | |
|---|---|---|---|
| 2011/0023066 A1 | 1/2011 | Jang et al. | |
| 2012/0229602 A1* | 9/2012 | Chen | H04N 19/597 348/43 |

(Continued)

FOREIGN PATENT DOCUMENTS

| | | |
|---|---|---|
| CN | 1954606 A | 4/2007 |
| CN | 103139588 A | 6/2013 |

(Continued)

OTHER PUBLICATIONS

Yu-Lin Chang, et al., 3D-HEVC HLS: Constraints on camera parameter signaling, Joint Collaborative Team on 3D Video Coding Extensions of ITU-T SG 16 WP 3 and IO/IEC JTC 1/SC/29/WG 11, Media Tek Inc., Document JCT3V-F0045, Nov. 1, 2013.

(Continued)

*Primary Examiner* — Gims S Philippe
*Assistant Examiner* — Stefan Gadomski
(74) *Attorney, Agent, or Firm* — Dentons US LLP

(57) ABSTRACT

The present invention relates to a device and a method for coding a 3D video, a decoding method, according to the present invention, comprising the steps of: receiving, through a first syntax, a camera parameter for switching a depth value into a disparity value; determining whether the camera parameter which applies to a previous slice or picture applies to a current slice or picture; and if the camera (Continued)

parameter applies to a current slice or picture, deriving a disparity value of a current block on the basis of the camera parameter. According to the present invention, slices or pictures of a certain interval may share the same camera parameter, the transmission of overlapping information may be prevented, and coding efficiency may be improved.

19 Claims, 8 Drawing Sheets

(51) Int. Cl.
*H04N 19/70* (2014.01)
*H04N 19/172* (2014.01)
*H04N 19/176* (2014.01)
*H04N 13/128* (2018.01)
*H04N 19/174* (2014.01)
*H04N 13/194* (2018.01)

(52) U.S. Cl.
CPC ......... *H04N 19/172* (2014.11); *H04N 19/174* (2014.11); *H04N 19/176* (2014.11); *H04N 19/70* (2014.11); *H04N 2013/0081* (2013.01); *H04N 2013/0085* (2013.01)

(58) Field of Classification Search
CPC ................ H04N 19/176; H04N 19/70; H04N 2013/0085; H04N 2013/0081
See application file for complete search history.

(56) References Cited

U.S. PATENT DOCUMENTS

| | | | | |
|---|---|---|---|---|
| 2012/0262547 | A1* | 10/2012 | Lee ................... | H04N 13/0066 348/43 |
| 2013/0033582 | A1* | 2/2013 | Sun ................... | H04N 13/0018 348/47 |
| 2013/0127987 | A1* | 5/2013 | Zhang ................. | H04N 19/597 348/42 |
| 2013/0127991 | A1* | 5/2013 | Oh ..................... | H04N 13/0048 348/43 |
| 2013/0147915 | A1* | 6/2013 | Wiegand ............ | H04N 13/0048 348/43 |
| 2013/0287291 | A1* | 10/2013 | Cho ................... | G06K 9/46 382/154 |
| 2014/0294067 | A1* | 10/2014 | Li ...................... | H04N 19/70 375/240.02 |
| 2014/0301485 | A1* | 10/2014 | Ramasubramonian ..................... H04N 19/895 375/240.27 |
| 2015/0030087 | A1* | 1/2015 | Chen ................. | H04N 13/0048 375/240.27 |
| 2015/0249841 | A1* | 9/2015 | Yu ..................... | H04N 19/463 375/240.02 |
| 2016/0044324 | A1* | 2/2016 | Deshpande ........... | H04N 19/70 375/240.25 |
| 2016/0057453 | A1* | 2/2016 | Chang ................. | H04N 19/597 375/240.12 |
| 2016/0134868 | A1* | 5/2016 | He ..................... | H04N 19/112 375/240.02 |

FOREIGN PATENT DOCUMENTS

| | | |
|---|---|---|
| KR | 10-2013-0056258 A | 5/2013 |
| KR | 10-2013-0056808 A | 5/2013 |
| WO | 2012-122364 A1 | 9/2012 |
| WO | 2013016231 A1 | 1/2013 |
| WO | 2013025151 A1 | 2/2013 |

OTHER PUBLICATIONS

Yu-Lin Chang, et al., 3D-HEVC HLS: On slice-level camera parameter signaling, Joint Collaborative Team on 3D Video Coding Extensions of ITU-T SG 16 WP 3 and IO/IEC JTC 1/SC/29/WG 11, MediaTek Inc., Document JCT3V-F0082, Nov. 1, 2013.

Hendry, et al.: "AHG: Short Slice Header", XP030054827, JCTVC-K0168_r1, Joint Collaborative Team on Video Coding (JCT-VC) of ITU-T SG16 WP3 and ISO/IEC JTC1/SC29/WG11, 11th Meeting, Shanghai, CN, Oct. 10-19, 2012.

Boyce, et al.: "Draft high efficiency video coding (HEVC) version 2, combined format range extensions (RExt), Scalability (SHVC), and multi-view (MV-HEVC) extensions", XP030116700, JCTVC-R10138_v3, Joint Collaborative Team on Video Coding (JCT-VC) of ITU-T SG16 WP3 and ISO/IEC JTC1/SC29/WG11, 18th Meeting, Sapporo, JP, Jun. 30-Jul. 9, 2014, p. 88.

Yoo, et al.: "On camera parameter transmission of 3D-HEVC", XP030132581, JCT3V-J0044, Joint Collaborative Team on 3D Video Coding Extensions of ITU-T SG16 WP3 and ISO/IEC JTC1/SC29/WG11, 10th Meeting, Strasbourg, FR, Oct. 18-24, 2014.

JCT3V-I1001_v3: Joint Collaborative Team on 3D Video Coding Extensions of ITU-T SG 16 WP 3 and ISO/IEC JTC 1/SC 29/WG 11, 9th Meeting: Sapporo, JP, Jul. 3-9, 2014, Editors, "3D-HEVC Draft Text 5," Gerhard Tech et al. , pp. 1-94.

JCT3V-F0082-v3: Joint Collaborative Team on 3D Video Coding Extensions, "3D-HEVC HLS: On slice-level camera parameter signaling," Yu-Lin Chang, MediaTek Inc., ITU-T SG 16 WP 3 and ISO/IEC JTC 1/SC 29/WG 11 5th Meeting: Geneva, CH, Oct. 25-Nov. 1, 2013, pp. 1-4.

JCT3V-I1003-v0: Joint Collaborative Team on 3D Video Coding Extension Development of ITU-T SG 16 WP 3 and ISO/IEC JTC 1/SC 29/WG 11 3th Meeting: Sapporo, JP, Jul. 3-9, 2014, "Test Model 9 of 3D-HEVC and MV-HEVC," Ying Chen et al., pp. 1-57.

\* cited by examiner

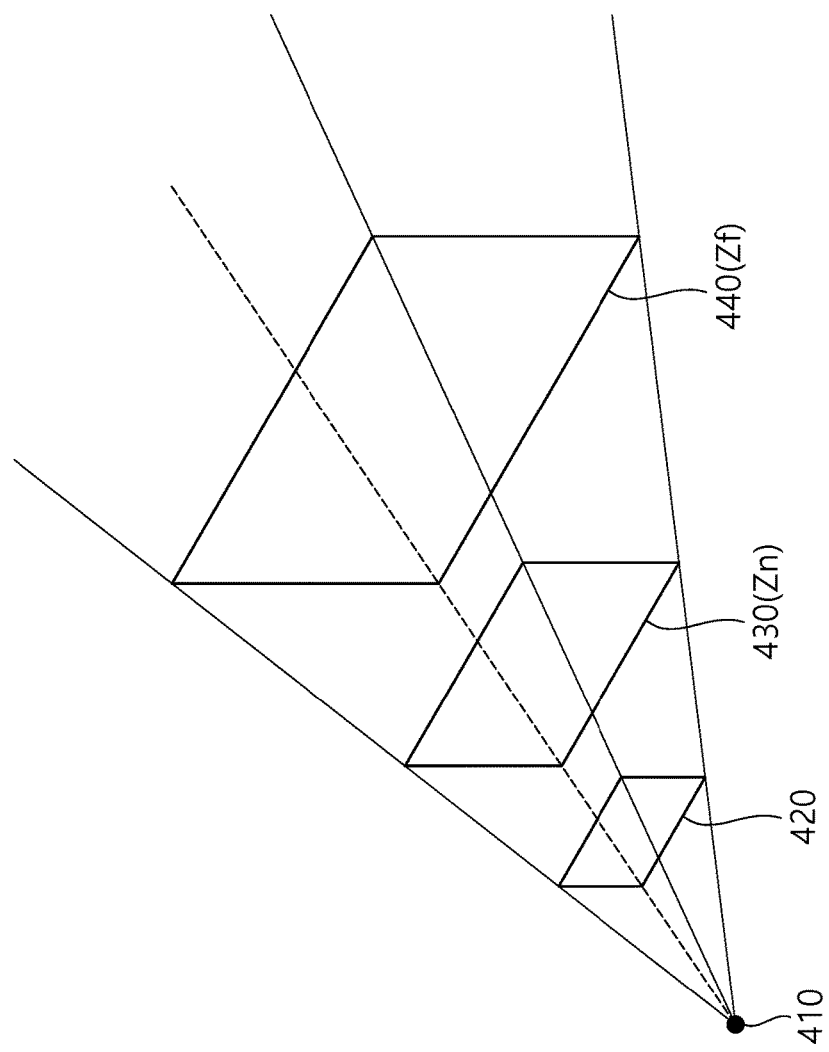

METHOD AND DEVICE FOR PROCESSING CAMERA PARAMETER IN 3D VIDEO CODING

This application is a U.S. National Phase Application under 35 U.S.C. § 371 of International Application PCT/KR2015/010129 filed on Sep. 24, 2015, which claims the benefit of U.S. Provisional Application Nos. 62/061,161 filed Oct. 8, 2014, and 62/092,273 filed Dec. 16, 2014, the entire content of the prior applications is hereby incorporated by reference.

BACKGROUND OF THE INVENTION

Field of the Invention

The present invention relates to a technique related to video coding, and more particularly, to a method and apparatus for processing a camera parameter in 3 dimensional (3D) video coding.

Related Art

In recent years, demands for a high-resolution and high-quality video have increased in various fields of applications. However, the higher the resolution and quality video data becomes, the greater the amount of video data becomes.

Accordingly, when video data is transferred using media such as existing wired or wireless broadband lines or video data is stored in existing storage media, the transfer cost and the storage cost thereof increase. High-efficiency video compressing techniques can be used to effectively transfer, store, and reproduce high-resolution and high-quality video data.

On the other hand, with realization of capability of processing a high-resolution/high-capacity video, digital broadcast services using a 3D video have attracted attention as a next-generation broadcast service. A 3D video can provide a sense of realism and a sense of immersion using multi-view channels.

A 3D video can be used in various fields such as free viewpoint video (FVV), free viewpoint TV (FTV), 3DTV, surveillance, and home entertainments.

Unlike a single-view video, a 3D video using multi-views have a high correlation between views having the same picture order count (POC). Since the same scene is shot with multiple neighboring cameras, that is, multiple views, multi-view videos have almost the same information except for a parallax and a slight illumination difference and thus difference views have a high correlation therebetween.

Accordingly, the correlation between different views can be considered for coding/decoding a multi-view video, and information need for coding and/or decoding of a current view can be obtained. For example, a block to be decoded in a current view can be predicted or decoded with reference to a block in another view.

SUMMARY OF THE INVENTION

The present invention provides a method and apparatus for predicting a current block in 3 dimensional (3D) video coding.

The present invention provides a method and apparatus for converting a depth value into a disparity value in 3D video coding.

The present invention provides a method and apparatus for sharing the same camera parameter between slices or pictures of a specific period in 3D video coding.

The present invention provides a method and apparatus for avoiding current overlapping camera parameter transmission.

According to one embodiment of the present invention, a 3D decoding method is provided. The decoding method includes receiving, through a first syntax, a camera parameter for converting a depth value into a disparity value, determining whether the camera parameter to be applied to a previous slice or picture is applied to a current slice or picture, and if the camera parameter is applied to the current slice or picture, deriving a disparity value for a current block on the basis of the camera parameter.

According to another embodiment of the present invention, a 3D video decoding apparatus is provided. The decoding apparatus includes a decoder for receiving, through a first syntax, a camera parameter for converting a depth value into a disparity value, and a predictor for determining whether the camera parameter to be applied to a previous slice or picture is applied to a current slice or picture, and if the camera parameter is applied to the current slice or picture, deriving a disparity value for a current block on the basis of the camera parameter.

According to the present invention, a depth value can be converted into a disparity value on the basis of a camera parameter received in 3 dimensional (3D) video coding.

According to the present invention, slices or pictures of a specific period can share the same camera parameter, thereby capable of avoiding overlapping information transmission and capable of improving coding efficiency.

BRIEF DESCRIPTION OF THE DRAWINGS

FIG. 4a and FIG. 4b illustrate a camera parameter that can be used in the present invention.

DESCRIPTION OF EXEMPLARY EMBODIMENTS

Figure 1:
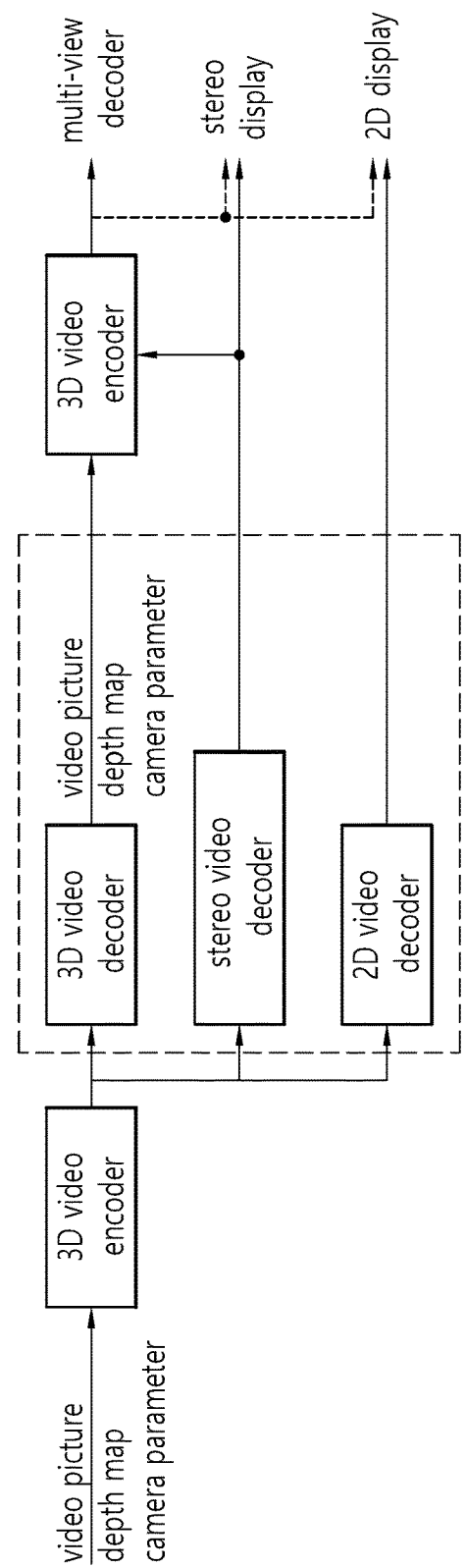
FIG. 1 briefly illustrates a 3 dimensional (3D) video encoding and decoding process to which the present invention is applicable.

The invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have"

in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions, and do not mean that the elements are embodied by independent hardware or independent software. For example, two or more elements out of the elements may be combined to form a single element, or one element may be split into plural elements. Embodiments in which the elements are combined and/or split belong to the scope of the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, a picture generally means a unit representing one image of a specific time zone, and a slice is a unit constituting a part of the picture in coding. One picture may consist of a plurality of slices. Optionally, the picture and the slice may be mixed with terms.

A pixel or a pel may mean a minimum unit constituting one picture (or image). Further, a 'sample' may be used as a term representing a value of a specific pixel. The sample may generally indicate a value of the pixel, may represent only a pixel value of a luma component, and may represent only a pixel value of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a 3 dimensional (3D) video encoding and decoding process to which the present invention is applicable.

Referring to FIG. 1, a 3D video encoder may encode a video picture, a depth map, and a camera parameter to output a bitstream.

The depth map may be constructed of distance information (depth information) between a camera and a subject with respect to a picture of a corresponding video picture (texture picture). For example, the depth map may be an image obtained by normalizing depth information according to a bit depth. In this case, the depth map may be constructed of depth information recorded without a color difference representation. The depth map may be called a depth map picture or a depth picture.

In general, a distance to the subject and a disparity are inverse proportional to each other. Therefore, disparity information indicating an inter-view correlation may be derived from the depth information of the depth map by using the camera parameter.

A bitstream including the depth map and the camera parameter together with a typical color image, i.e., a video picture (texture picture), may be transmitted to a decoder through a network or a storage medium.

From a decoder side, the bitstream may be received to reconstruct a video. If a 3D video decoder is used in the decoder side, the 3D video decoder may decode the video picture, the depth map, and the camera parameter from the bitstream. Views required for a multi-view display may be synthesized on the basis of the decoded video picture, depth map, and camera parameter. In this case, if a display in use is a stereo display, a 3D image may be displayed by using pictures for two views among reconstructed multi-views.

If a stereo video decoder is used, the stereo video decoder may reconstruct two pictures to be incident to both eyes from the bitstream. In a stereo display, a stereoscopic image may be displayed by using a view difference or disparity of a left image which is incident to a left eye and a right image which is incident to a right eye. When a multi-view display is used together with the stereo video decoder, a multi-view may be displayed by generating different views on the basis of reconstructed two pictures.

If a 2D decoder is used, a 2D image may be reconstructed to output the image to a 2D display. If the 2D display is used but the 3D video decoder or the stereo video decoder is used as the decoder, one of the reconstructed images may be output to the 2D display.

In the structure of FIG. 1, a view synthesis may be performed in a decoder side or may be performed in a display side. Further, the decoder and the display may be one device or may be separate devices.

Although it is described for convenience in FIG. 1 that the 3D video decoder and the stereo video decoder and the 2D video decoder are separate decoders, one decoding device may perform all of the 3D video decoding, the stereo video decoding, and the 2D video decoding. Further, the 3D video decoding device may perform the 3D video decoding, the stereo video decoding device may perform the stereo video decoding, and the 2D video decoding device may perform the 2D video decoding. Further, the multi-view display may output the 2D video or may output the stereo video.

Figure 2:
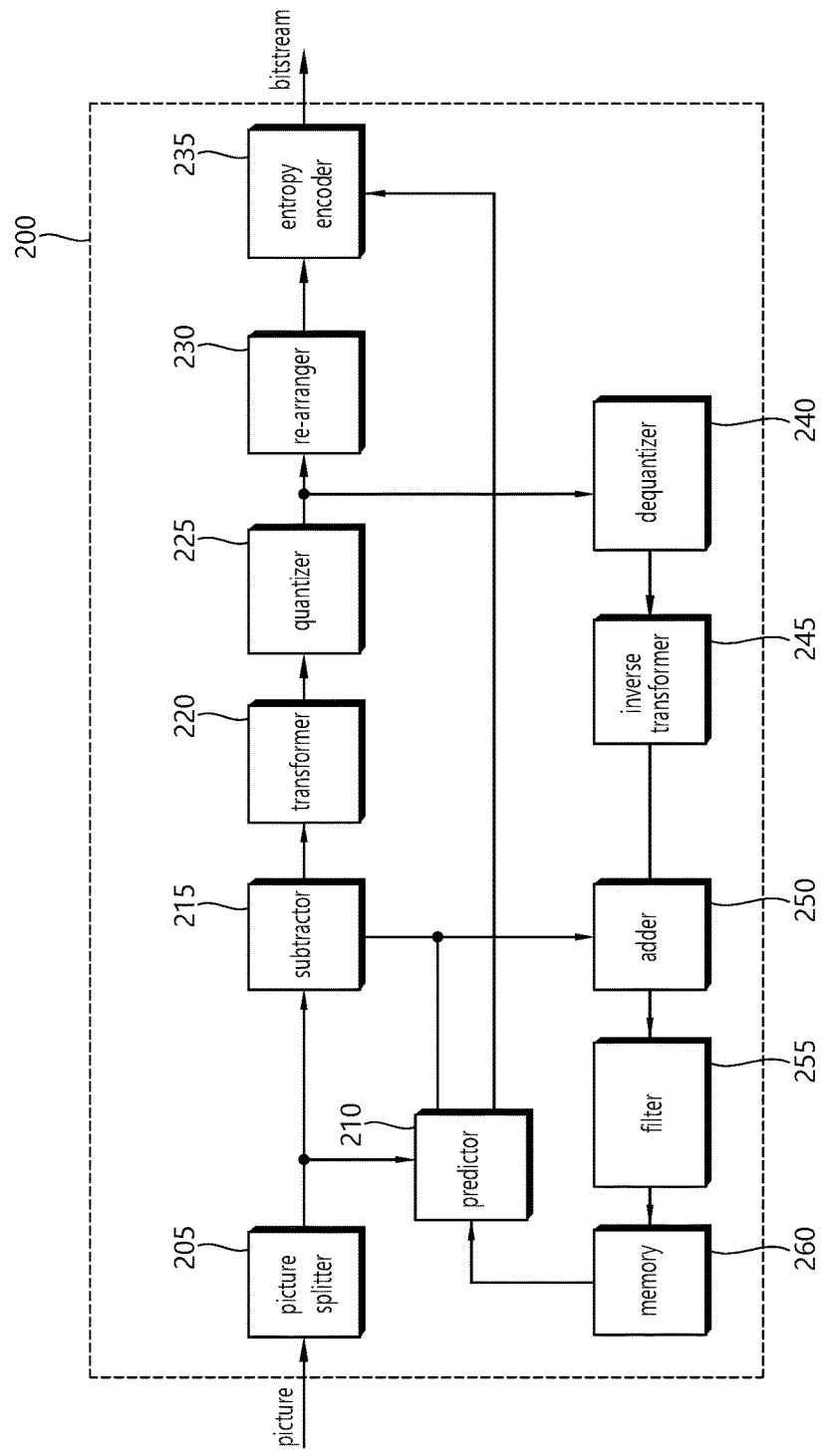
FIG. 2 briefly illustrates a structure of a video encoding device to which the present invention is applicable.

FIG. 2 briefly illustrates a structure of a video encoding device to which the present invention is applicable.

Referring to FIG. 2, a video encoding device 200 includes a picture splitter 205, a predictor 210, a subtractor 215, a transformer 220, a quantizer 225, a re-arranger 230, an entropy encoder 235, a dequantizer 240, an inverse transformer 245, an adder 250, a filter 255, and a memory 260.

The picture splitter 205 may split an input picture into at least one processing unit block. In this case, the processing unit block may be a coding unit block, a prediction unit block, or a transform unit block. As a unit block of coding, the coding unit block may be split from a largest coding unit block according to a quad-tree structure. As a block partitioned from the coding unit block, the prediction unit block may be a unit block of sample prediction. In this case, the prediction unit block may be divided into sub blocks. The transform unit block may be split from the coding unit block according to the quad-tree structure, and may be a unit block for deriving according to a transform coefficient or a unit block for deriving a residual signal from the transform coefficient.

Hereinafter, the coding unit block may be called a coding block (CB) or a coding unit (CU), the prediction unit block may be called a prediction block (PB) or a prediction unit (PU), and the transform unit block may be called a transform block (TB) or a transform unit (TU).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 210 may perform prediction on a processing target block (hereinafter, a current block), and may generate a prediction block including prediction samples for the current block. A unit of prediction performed in the predictor 210 may be a coding block, or may be a transform block, or may be a prediction block.

The predictor 210 may determine whether intra prediction is applied or inter prediction is applied to the current block. For example, the predictor 210 may determine whether the intra prediction or the inter prediction is applied in unit of CU.

In case of the intra prediction, the predictor 210 may derive a prediction sample for the current block on the basis of a reference sample outside the current block in a picture to which the current block belongs (hereinafter, a current picture). In this case, the predictor 210 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode, and the case (ii) may be called a directional mode. The predictor 210 may determine the prediction mode to be applied to the current block by using the prediction mode applied to the neighboring block.

In case of the inter prediction, the predictor 210 may derive the prediction sample for the current block on the basis of a sample specified by a motion vector on a reference picture. The predictor 210 may derive the prediction sample for the current block by applying any one of a skip mode, a merge mode, and a motion vector prediction (MVP) mode. In case of the skip mode and the merge mode, the predictor 210 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter prediction, the neighboring block includes a spatial neighboring block existing in the current picture and a temporal neighboring block existing in the reference picture. The reference picture including the temporal neighboring block may also be called a collocated picture (colPic). Motion information may include the motion vector and the reference picture. If the motion information of the temporal neighboring block is used in the skip mode and the merge mode, a top picture on a reference picture list may be used as the reference picture.

A multi-view may be divided into an independent view and a dependent view. In case of encoding for the independent view, the predictor 210 may perform not only inter prediction but also inter-view prediction.

The predictor 210 may configure the reference picture list by including pictures of different views. For the inter-view prediction, the predictor 210 may derive a disparity vector. Unlike in the motion vector which specifies a block corresponding to the current block in a different picture in the current view, the disparity vector may specify a block corresponding to the current block in another view of the same access unit (AU) as the current picture. In the multi-view, for example, the AU may include video pictures and depth maps corresponding to the same time instance. Herein, the AU may mean a set of pictures having the same picture order count (POC). The POC corresponds to a display order, and may be distinguished from a coding order.

The predictor 210 may specify a depth block in a depth view on the basis of the disparity vector, and may perform merge list configuration, an inter-view motion prediction, residual prediction, illumination compensation (IC), view synthesis, or the like.

The disparity vector for the current block may be derived from a depth value by using a camera parameter, or may be derived from a motion vector or disparity vector of a neighboring block in a current or different view.

For example, the predictor 210 may add, to the merging candidate list, an inter-view merging candidate (IvMC) corresponding to temporal motion information of a reference view, an inter-view disparity vector candidate (IvDC) corresponding to a disparity vector, a shifted IvMC derived by a shift of a disparity vector, a texture merging candidate (T) derived from a corresponding texture picture when a current block is a block on a depth map, a disparity derived merging candidate (D) derived by using a disparity from the texture merging candidate, a view synthesis prediction candidate (VSP) derived on the basis of view synthesis, or the like.

In this case, the number of candidates included in the merging candidate list to be applied to the dependent view may be limited to a specific value.

Further, the predictor 210 may predict the motion vector of the current block on the basis of the disparity vector by applying the inter-view motion vector prediction. In this case, the predictor 210 may derive the disparity vector on the basis of a conversion of a largest depth value in a corresponding depth block. When a position of a reference sample in a reference view is specified by adding the disparity vector to a sample position of the current block in the reference view, a block including the reference sample may be used as a reference block. The predictor 210 may use the motion vector of the reference block as a candidate motion parameter of the current block or a motion vector predictor candidate, and may use the disparity vector as a candidate disparity vector for a disparity compensated prediction (DCP).

The subtractor 215 generates a residual sample which is a difference between an original sample and a prediction sample. If the skip mode is applied, the residual sample may not be generated as described above.

The transformer 220 transforms a residual sample in unit of a transform block to generate a transform coefficient. The quantizer 225 may quantize the transform coefficients to generate a quantized transform coefficient.

The re-arranger 230 re-arranges the quantized transform coefficients. The re-arranger 230 may re-arrange the quantized transform coefficients having a block shape in a 1D vector form by using a scanning method.

The entropy encoder 235 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 235 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The adder 250 adds the residual sample and the prediction sample to reconstruct the picture. The residual sample and the prediction sample may be added in unit of blocks to generate a reconstruction block. Although it is described herein that the adder 250 is configured separately, the adder 250 may be a part of the predictor 210.

The filter 255 may apply deblocking filtering and/or a sample adaptive offset to the reconstructed picture. An artifact of a block boundary in the reconstructed picture or a distortion in a quantization process may be corrected through the deblocking filtering and/or the sample adaptive offset. The sample adaptive offset may be applied in unit of samples, and may be applied after a process of the deblocking filtering is complete.

The memory 260 may store the reconstructed picture or information required for encoding/decoding. For example, the memory 260 may store (reference) pictures used in inter prediction/inter-view prediction. In this case, pictures used in the inter prediction/inter-view prediction may be designated by a reference picture set or a reference picture list.

Although it is described herein that one encoding device encodes an independent view and a dependent view, this is for convenience of explanation. Thus, a separate encoding device may be configured for each view, or a separate internal module (e.g., a prediction module for each view) may be configured for each view.

Figure 3:
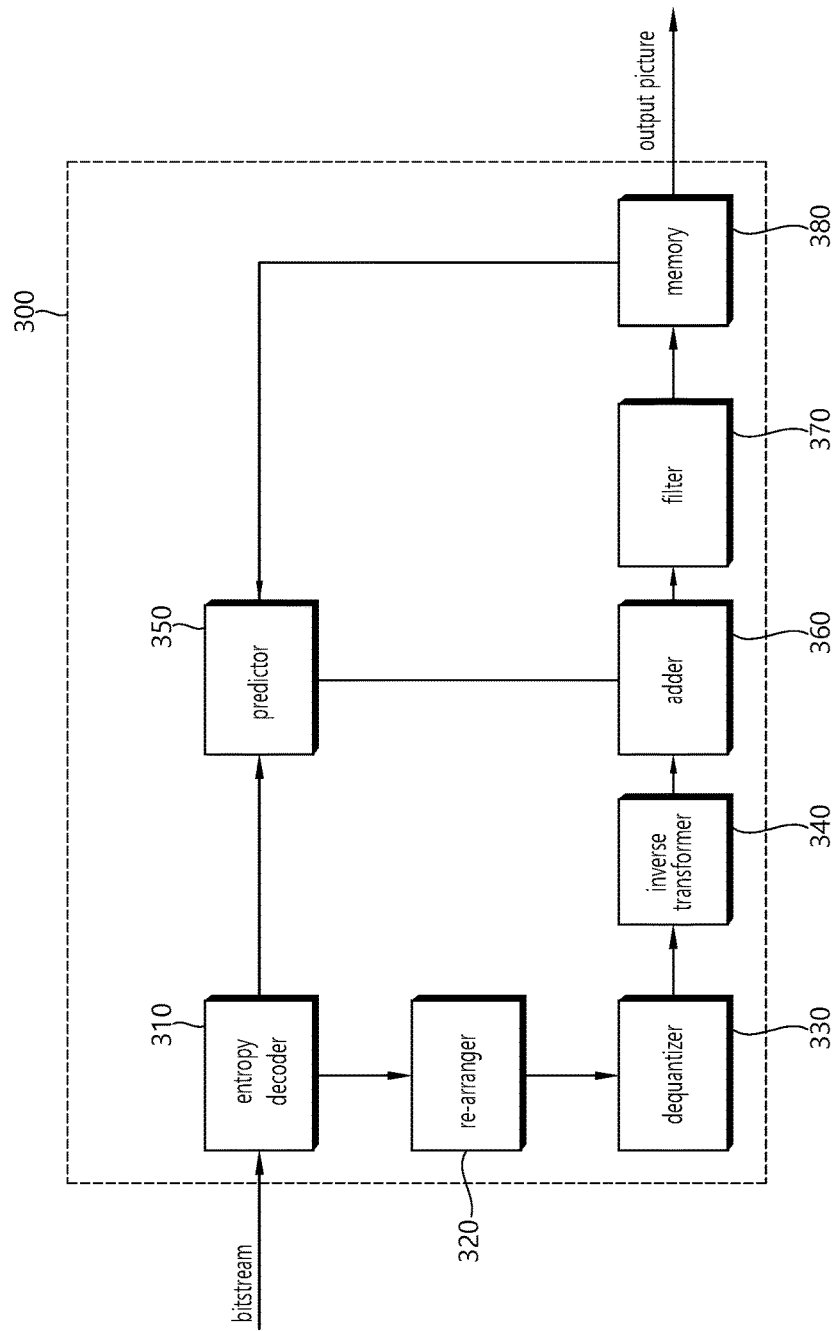
FIG. 3 briefly illustrates a structure of a video decoding device to which the present invention is applicable.

FIG. 3 briefly illustrates a structure of a video decoding device to which the present invention is applicable.

Referring to FIG. 3, a video decoding device 300 includes an entropy decoder 310, a re-arranger 320, a dequantizer 330, an inverse transformer 340, a predictor 350, an adder 360, a filter 370, and a memory 380.

When a bitstream including video information is input, the video decoding device 300 may reconstruct a video in association with a process by which video information is processed in the video encoding device.

For example, the video decoding device 300 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 310 may parse the bitstream to output information required for video reconstruction or picture reconstruction. For example, the entropy decoder 310 may decode information in the bitstream on the basis of a coding method such as exponential Golomb encoding, CAVLC, CABAC, or the like, and may output a value of a syntax element required for video reconstruction and a quantized value of a transform coefficient regarding a residual.

If a plurality of views are processed to reproduce a 3D video, the bitstream may be input for each view. Alternatively, information regarding each view may be multiplexed in the bitstream. In this case, the entropy decoder 310 may de-multiplex the bitstream to parse it for each view.

The re-arranger 320 may re-arrange quantized transform coefficients in a form of a 2D block. The re-arranger 320 may perform re-arrangement in association with coefficient scanning performed in an encoding device.

The dequantizer 330 may de-quantize the quantized transform coefficients on the basis of a (de)quantization parameter to output a transform coefficient. In this case, information for deriving a quantization parameter may be signaled from the encoding device.

The inverse transformer 340 may inverse-transform the transform coefficients to derive residual samples.

The predictor 350 may perform prediction on a current block, and may generate a prediction block including prediction samples for the current block. A unit of prediction performed in the predictor 350 may be a coding block or may be a transform block or may be a prediction block.

The predictor 350 may determine whether to apply intra prediction or inter prediction. In this case, a unit for determining which one will be used between the intra prediction and the inter prediction may be different from a unit for generating a prediction sample. In addition, a unit for generating the prediction sample may also be different in the inter prediction and the intra prediction. For example, which one will be applied between the inter prediction and the intra prediction may be determined in unit of CU. Further, for example, in the inter prediction, the prediction sample may be generated by determining the prediction mode in unit of PU, and in the intra prediction, the prediction sample may be generated in unit of TU by determining the prediction mode in unit of PU.

In case of the intra prediction, the predictor 350 may derive a prediction sample for a current block on the basis of a neighboring reference sample in a current picture. The predictor 350 may derive the prediction sample for the current block by applying a directional mode or a non-directional mode on the basis of the neighboring reference sample of the current block. In this case, a prediction mode to be applied to the current block may be determined by using an intra prediction mode of a neighboring block.

In case of the inter prediction, the predictor 350 may derive the prediction sample for the current block on the basis of a sample specified on a reference picture by a motion vector on the reference picture. The predictor 350 may derive the prediction sample for the current block by applying any one of a skip mode, a merge mode, and an MVP mode.

In case of the skip mode and the merge mode, motion information of the neighboring block may be used as motion information of the current block. In this case, the neighboring block may include a spatial neighboring block and a temporal neighboring block.

The predictor 350 may construct a merging candidate list by using motion information of an available neighboring block, and may use information indicated by a merge index on the merging candidate list as a motion vector of the current block. The merge index may be signaled from the encoding device. The motion information may include the motion vector and the reference picture. When motion information of the temporal neighboring block is used in the skip mode and the merge mode, a highest picture on the reference picture list may be used as the reference picture.

In case of the skip mode, unlike in the merge mode, a difference (residual) between the prediction sample and the original sample is not transmitted.

In case of the MVP mode, the motion vector of the current block may be derived by using the motion vector of the neighboring block as a motion vector predictor. In this case, the neighboring block may include a spatial neighboring block and a temporal neighboring block.

In case of the dependent view, the predictor 350 may perform inter-view prediction. In this case, the predictor 350 may configure the reference picture list by including pictures of different views.

For the inter-view prediction, the predictor 350 may derive a disparity vector. The predictor 350 may specify a depth block in a depth view on the basis of the disparity vector, and may perform merge list configuration, an inter-view motion prediction, residual prediction, illumination compensation (IC), view synthesis, or the like.

The disparity vector for the current block may be derived from a depth value by using a camera parameter, or may be derived from a motion vector or disparity vector of a neighboring block in a current or different view. The camera parameter may be signaled from the encoding device.

When the merge mode is applied to the current block of the dependent view, the predictor 350 may add, to the merging candidate list, an IvMC corresponding to temporal motion information of a reference view, an IvDC corresponding to a disparity vector, a shifted IvMC derived by a shift of a disparity vector, a texture merging candidate (T) derived from a corresponding texture picture when a current block is a block on a depth map, a disparity derived merging candidate (D) derived by using a disparity from the texture merging candidate, a view synthesis prediction candidate (VSP) derived on the basis of view synthesis, or the like.

In this case, the number of candidates included in the merging candidate list to be applied to the dependent view may be limited to a specific value.

Further, the predictor 350 may predict the motion vector of the current block on the basis of the disparity vector by applying the inter-view motion vector prediction. In this case, the predictor 350 may use a block in a reference view specified by the disparity vector as a reference block. The predictor 350 may use the motion vector of the reference block as a candidate motion parameter or a motion vector predictor candidate of the current block, and may use the disparity vector as a candidate vector for disparity compensated prediction (DCP).

The adder 360 may add the residual sample and the prediction sample to reconstruct the current block or the current picture. The adder 360 may add the residual sample and the prediction sample in unit of blocks to reconstruct the current picture. When the skip mode is applied, a residual is not transmitted, and thus the prediction sample may be a reconstruction sample. Although it is described herein that the adder 360 is configured separately, the adder 360 may be a part of the predictor 350.

The filter 370 may apply de-blocking filtering and/or a sample adaptive offset to the reconstructed picture. In this case, the sample adaptive offset may be applied in unit of samples, and may be applied after de-blocking filtering.

The memory 380 may store a reconstructed picture and information required in decoding. For example, the memory 380 may store pictures used in inter prediction/inter-view prediction. In this case, pictures used in the inter prediction/inter-view prediction may be designated by a reference picture set or a reference picture list. The reconstructed picture may be used as a reference picture for a different picture.

Further, the memory 380 may output the reconstructed picture according to an output order. Although not shown, an output unit may display a plurality of different views to reproduce a 3D image.

Although it is described in the example of FIG. 3 that an independent view and a dependent view are decoded in one decoding device, this is for exemplary purposes only, and the present invention is not limited thereto. For example, each decoding device may operate for each view, and an internal module (for example, a prediction module) may be provided in association with each view in one decoding device.

Multi-view video coding may perform coding on a current picture by using decoding data of a different view belonging to the same access unit (AU) as the current picture to increase video coding efficiency for the current view.

In the multi-view video decoding, views may be coded in unit of AU, and pictures may be coded in unit of views. Coding is performed between views according to a determined order. A view which can be coded without a reference of another view may be called a base view or an independent view. Further, a view which can be coded with reference to an independent view or another view after the independent view is coded may be called a dependent view or an extended view. Further, if the current view is a dependent view, a view used as a reference in coding of the current view may be called a reference view. Herein, coding of a view includes coding of a video picture, a depth map, or the like belonging to the view.

A 3D video includes a video picture (or a texture picture) having typical color image information and a depth map having depth information regarding a video picture. In the 3D video, a plurality of video pictures having different time instances may be present in the same POC, and a depth map corresponding to each of the plurality of video pictures may be present. Further, the plurality of video pictures may be acquired from a plurality of cameras having different time instances.

The 3D video may be represented as a multi-view video plus depth format. In the encoding device, several captured views and related depth maps are coded, and resulting bitstream packets may be multiplexed into a 3D video bitstream. In the decoding device, data regarding a video picture and a depth map is decoded, and if necessary, an additional intermediate view may be synthesized by using a depth-image-based rendering (DIBR) scheme. For the view synthesis, a camera parameter may be additionally included in the bitstream. The camera parameter may include $Z_{Far}$, $Z_{near}$, a focal length, etc.

Figure 4A:
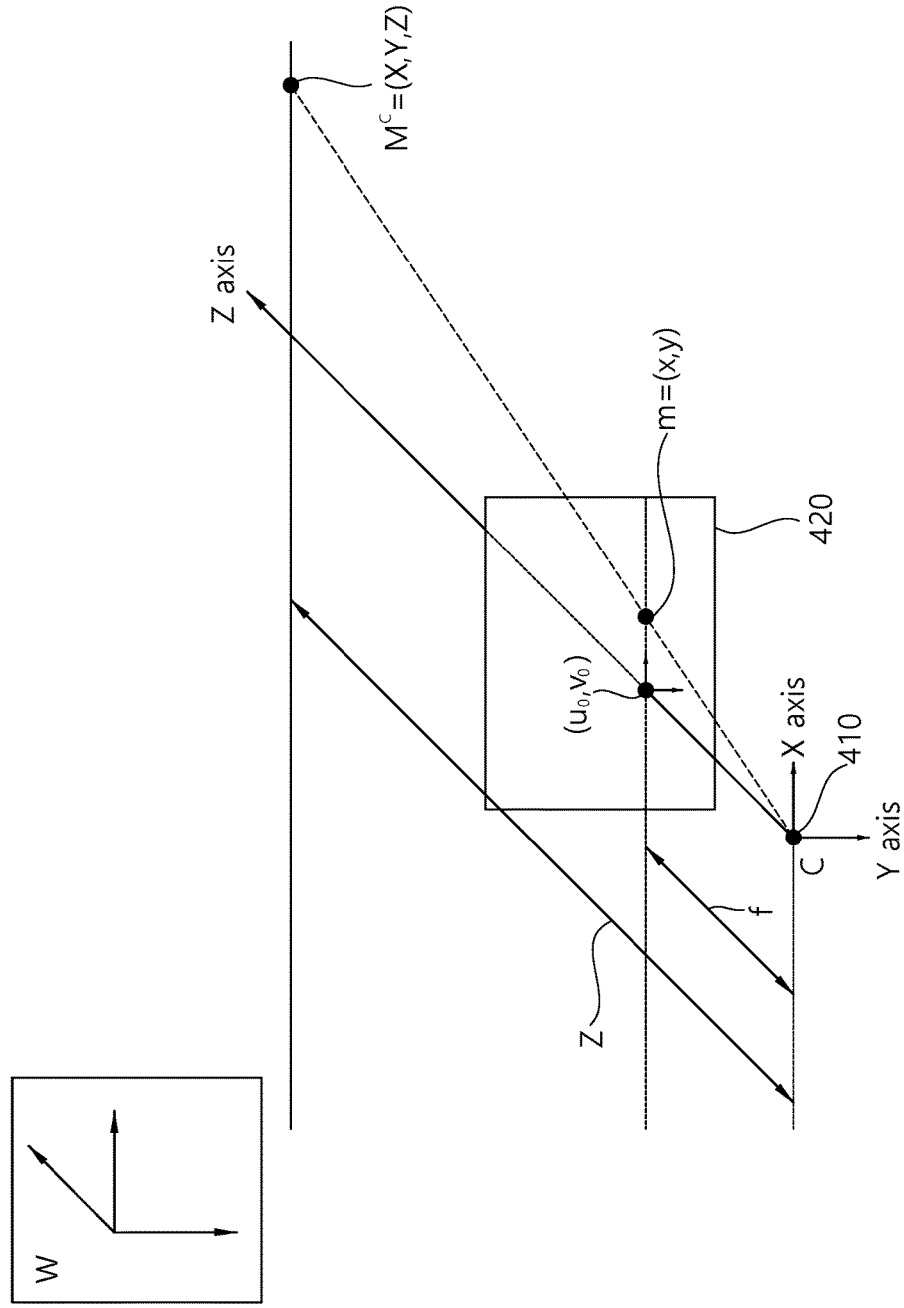

FIG. 4b and FIG. 4b illustrate a camera parameter that can be used in the present invention. An embodiment of a camera model that can be used in 3D video is shown in FIG. 4a and FIG. 4b.

As described above, the camera parameter may be used to synthesize a reference picture used for VSP, and may also be used to generate an intermediary time instance image in a decoding device. Accordingly, the decoding device may encode the camera parameter for each time instance to transmit it to the decoding device through a network or a storage medium.

Referring to FIG. 4A, a coordinate system indicated by W may imply a 'reference coordinate system' used to designate a position of a camera on a space. Further, a coordinate system indicated by C may imply a 'camera coordinate system' which has a focal point 410 of a camera corresponding to camera parameters illustrated in FIG. 4A as an origin. Furthermore, an image plane in which an image acquired by the camera is displayed is indicated by 420 of FIG. 4A.

In the embodiment of FIG. 4A, f indicates a distance from the focal point 410 of the camera to the image plane 420 (a distance on a z-axis), that is, a focal length. Further, $(u_0, v_0)$ may indicate a coordinate of a point at which an optical axis of the camera meets the image plane 420, that is, a coordinate of a principal point. The optical axis may imply a vertical coordinate axis of the image plane 420 in the camera coordinate system, and is shown as the z-axis in FIG. 4a. Therefore, a distance from the focal point 410 of the camera to the principal point may correspond to the focal length.

The aforementioned three parameters (f, u0, v0) may be called an intrinsic camera parameter.

Meanwhile, the camera parameter may be a 3×3 rotation matrix R and 3×1 translation vector T used to indicate a camera coordinate system C with respect to the reference coordinate system W. Herein, the 3×3 rotation matrix R indicates a rotation degree by which the camera coordinate system rotates on a 3D space with respect to the reference coordinate system. That is, the 3×3 rotation matrix R indicates a 3D rotation of the camera coordinate system with respect to the reference coordinate system. Further, the 3×1 translation vector T is a vector indicating a position of the camera coordinate system with respect to the reference coordinate system. The 3×3 rotation matrix R and the 3×1 translation vector T may indicate a geometric relation of the reference coordinate system and the camera coordinate system. Accordingly, the two parameters may be called an extrinsic camera parameter.

FIG. 4b illustrates three planes orthogonal to an optical axis of a camera. A focal point of the camera, that is, an origin of a camera coordinate system, is indicated by 410 of FIG. 4b, and an image plane is indicated by 420.

A scene captured by one camera may have various depth values. In this case, a point having a smallest depth value may be a point which is closest in distance to the camera, and a point having a greatest depth value may be a point which is farthest in distance from the camera. A plane corresponding to the smallest depth value in the scene captured by the camera having the focal point 410 may be indicated by 430 of FIG. 4b, and may be called a near clipping plane. Further, a plane corresponding to the greatest depth value in the scene captured by the camera having the focal point 410 may be indicated by 440 of FIG. 4b, and may be called a far clipping plane.

In any scene captured by one camera, the smallest depth value may be indicated by $Z_{near}(Z_n)$, and may correspond to a depth value of the near clipping plane 430. The greatest depth value may be indicated by $Z_{far}(Z_f)$, and may correspond to a depth value of the far clipping plane 440. The values $Z_{near}$ and $Z_{far}$ correspond to a camera parameter, and may be called a Z-clipping parameter.

Depth data processed in an encoding device and transmitted to a decoding device may have a value based on a bit depth. For example, if the bit depth is 8, depth sample values in a depth map may have a value in the range of 0 to 255. In this case, the depth sample values may correspond to depth values in the range of Z-clipping parameters $Z_{near}$ and $Z_{far}$. Accordingly, the quantized depth sample values may be transformed to real depth values on the basis of the Z-clipping parameters $Z_{near}$ and $Z_{far}$. This may be expressed for example by the following equation.

$$z = \frac{1}{\frac{v}{255} \cdot \left(\frac{1}{Z_{near}} - \frac{1}{Z_{far}}\right) + \frac{1}{Z_{far}}} \quad \text{[Equation 1]}$$

Herein, $Z_{near}$ denotes a near clipping parameter, and $Z_{far}$ denotes a far clipping parameter. Further, z denotes a real depth value, and v denotes intensity of a depth sample value included in a depth map.

In addition, a camera parameter may be used to convert the depth value into the disparity value also in VSP which performs prediction on a current picture (or block) by using a picture of a view synthesized on the basis of DIBR as a reference picture and in a depth refinement or the like performed on a disparity vector candidate on the basis of a corresponding depth block. The camera parameter for such a conversion may be called a conversion parameter, and may be used to configure a depth-to-disparity table. The camera parameters required to convert the depth value into the disparity value may be included in a bitstream, and the camera parameter (or conversion parameter) may include parameters regarding a scale factor and an offset. A vertical component of the disparity vector may be set to 0, and a horizontal component of the disparity vector may be derived on the basis of the following equation.

$$d_v = (s * v + o) >> n, \quad \text{[Equation 2]}$$

Herein, v is a depth sample value, s is a scale factor, o is an offset, and n is a shift parameter based on required accuracy of the disparity vector. In backward conversion for deriving a disparity vector between a current view and a view with a view index j and having a depth sample, the scale factor may be derived based on cp_scale[j], and the offset may be derived based on cp_off[j]. Further, in forward conversion for deriving a disparity vector between the view with the view index j and the current view having the depth sample, the scale factor may be derived based on cp_inv_scale_plus_scale[j], and the offset may be derived based on cp_inv_off_plus_off[j].

In the present invention, a camera parameter may include a plurality of parameters, and may be called a camera parameter set. The camera parameter may be shared or changed between pictures of a view over time. For example, if a position of a camera is fixed until a 3D video ends or if a relative position of multi-view cameras does not change, each picture of a view may share one camera parameter. In this case, a representative camera parameter of the view may be transmitted through a video parameter set (VPS) syntax. In this case, the VPS syntax may be represented for example as follows.

TABLE 1

| | |
|---|---|
| ... | |
| cp_in_slice_segment_header_flag[i] | u(1) |
| if(!cp_in_slice_segment_header_flag[i]) | |
| for(j=0;j < i;j++){ | |
| vps_cp_scale[i][j] | se(v) |
| vps_cp_off[i][j] | se(v) |
| vps_cp_inv_scale_plus_scale[i][j] | se(v) |
| vps_cp_inv_off_plus_off[i][j] | se(v) |
| } | |

Herein, cp_in_slice_segment_header_flag is flag information indicating whether a camera parameter is present in a slice segment header as to an i-th view.

A value of cp_in_slice_segment_header_flag[i] equal to 0 specifies that camera parameter related syntax elements vps_cp_scale[i][j], vps_cp_off[i][j], vps_cp_inv_scale_plus_scale[i][j], and vps_cp_inv_off_plus_off[i][j], are present in the VPS, and cp_scale[j], cp_off[j], cp_inv_scale_plus_scale[j], and cp_inv_off_plus_off[j] are not present in slice segment headers having nuh_layer_id equal to layerId and having VpsViewIdx[layerId] equal to i.

Herein, vps_cp_scale[i][j], vps_cp_off[i][j], vps_cp_inv_scale_plus_scale[i][j], and vps_cp_inv_off_plus_off[i][j] specify a parameter for converting a depth value into a disparity value. vps_cp_scale[i][j], vps_cp_off[i][j], vps_cp_inv_scale_plus_scale[i][j], and vps_cp_inv_off_plus_off[i][j] may be used to derive values of cp_scale[j], cp_off[j], cp_inv_scale_plus_scale[j], and cp_inv_off_plus_off[j] as to the i-th view specified in the VPS.

For another example, a value of a camera parameter may change over time due to a motion of a camera. In this case, a camera parameter may vary between pictures of one view, and the camera parameter may be transmitted through a slice segment header. In this case, the slice segment header may be represented for example as follows.

TABLE 2

| | |
|---|---|
| ... | |
| if(nuh_layer_id > 0 && | |
| cp_in_slice_segment_header_flag[ViewIdx]) | |
| for(j=0;j < ViewIdx;j++){ | |
| cp_scale[j] | se(v) |
| cp_off[j] | se(v) |
| cp_inv_scale_plus_scale[j] | se(v) |
| cp_inv_off_plus_off[j] | se(v) |
| } | |

That is, a value of cp_in_slice_segment_header_flag[i] equal to 1 specifies that cp_scale[j], cp_off[j], cp_inv_scale_plus_scale[j], and cp_inv_off_plus_off[j] which are parameters for converting a depth value into a disparity value are present in slice segment headers having VpsViewIdx[layerId] equal to i.

That is, according to the above description, if the camera parameter changes even once in one view, the camera parameter may be transmitted through the slice segment header. In this case, if there is no additional restriction, the camera parameter may be transmitted for every slice.

However, even in a case where the same camera parameter is used in a specific period instead of changing the camera parameter for every POC, if the camera parameter is transmitted for every slice, the same information may be unnecessarily transmitted in an overlapping manner, and coding efficiency may deteriorate.

According to embodiments of the present invention described below, overlapping transmission of the camera parameter may be avoided, and pictures (or slices) of a specific period in a view may share the same camera parameter. According to the present invention, if a current slice (or picture) uses the same camera parameter as a previous slice (or picture), a camera parameter of the previous slice (or picture) may be used instead of newly transmitting the same value.

In one embodiment, flag information indicating whether the camera parameter used in the previous slice is used in a slice segment header may be transmitted. For example, if the flag information is 1, the camera parameter (e.g., cp_scale[j], cp_off[j], cp_inv_scale_plus_scale[j], and cp_inv_off_plus_off[j]) is not transmitted by being included in the slice segment header. If the flag information is 0, a new camera parameter may be transmitted by being included in the slice segment header, and a decoding device may parse and use the conversion parameter. Alternatively, on the contrary, if the flag information is 0, the new parameter is not transmitted by being included in the slice segment header, and if the flag information is 1, the camera parameter may be transmitted by being included in the slice segment header. In this case, if a picture to be decoded currently is a random access point, the camera parameter may be parsed unconditionally. The slice segment header may be represented for example as follows.

TABLE 3

| slice segment header( ) { | Descriptor |
|---|---|
| ... | |
| if(nuh_layer_id > 0 && | |
| cp_in_slice_segment_header_flag[ViewIdx]) | |
| prev_cp_in_slice_segment_header_flag[ViewIdx] | u(1) |
| if(!prev_cp_in_slice_segment_header_flag[ViewIdx]) | |
| for(j=0;j < ViewIdx;j++){ | |
| cp_scale[j] | se(v) |
| cp_off[j] | se(v) |
| cp_inv_scale_plus_scale[j] | se(v) |
| cp_inv_off_plus_off[j] | se(v) |
| } | |
| ... | |
| } | |

Herein, prev_cp_in_slice_segment_header_flag is flag information indicating whether a camera parameter used in a previous slice is used in a current slice.

A value of prev_cp_in_slice_segment_header_flag[ViewIdx] equal to 0 specifies that syntax elements cp_scale[j], cp_off[j], cp_inv_scale_plus_scale[j], and cp_inv_off_plus_off[j] are present in a slice segment header.

A value prev_cp_in_slice_segment_header_flag[ViewIdx] equal to 1 specifies that cp_scale[j], cp_off[j], cp_inv_scale_plus_scale[j], and cp_inv_off_plus_off[j] are not present in a slice segment header, and cp_scale[j], cp_off[j], cp_inv_scale_plus_scale[j], and cp_inv_off_plus_off[j] are derived from syntax elements corresponding to a previous slice segment header having a view index equal to ViewIdx If prev_cp_in_slice_segment_header_flag[ViewIdx] is not present, a value of prev_cp_in_slice_segment_header_flag[ViewIdx] may be inferred to be equal to 1. If a picture on an access unit with nuh_layer_id equal to 0 is an intra random access point (IRAP) picture, a value of prev_cp_in_slice_segment_header_flag[ViewIdx] in the slice segment header may be equal to 0.

cp_scale[j], cp_off[j], cp_inv_scale_plus_scale[j], and cp_inv_off_plus_off[j] specify parameters for converting a depth value into a disparity value. If the parameters are not present and a value of prev_cp_in_slice_segment_header_flag[ViewIdx] is equal to 0, cp_scale[j], cp_off[j], cp_inv_scale_plus_scale[j], and cp_inv_off_plus_off[j] may be inferred to be respectively equal to vps_cp_scale[ViewIdx][j], vps_cp_off[ViewIdx][j], vps_cp_inv_scale_plus_scale[ViewIdx][j], and vps_cp_inv_off_plus_off[ViewIdx][j]. Herein, if ViewIdxA is equal to ViewIdxB, cp_off[j], cp_inv_scale_plus_scale[j], and cp_inv_off_plus_off[j] in a slice segment header having ViewIdx equal to ViewIdxA are equal to cp_scale[j], cp_off[j], cp_inv_scale_plus_scale[j], and cp_inv_off_plus_off[j] in a slice segment header having ViewIdx equal to ViewIdxB.

For another embodiment, when the camera parameter is changed over time, a default camera parameter may be transmitted through VPS, and flag information indicating whether the camera parameter is updated may be transmitted through a slice segment header. In this manner, the decoding device may determine whether to parse a new camera parameter. If the flag information indicates 0, the camera parameter is not included in the slice segment header, and a camera parameter of a current time instance and stored in the decoding device is used. That is, if the camera parameter is not updated even once, the default camera parameter will be stored in the decoding device. If the camera parameter is updated and thus the flag information indicates 1, the decoding device parses a new camera parameter value included in the slice segment header, and updates the camera parameter shared for the current time instance. In this case, if a picture which is currently being decoded is a random access point, the camera parameter may be parsed unconditionally.

In this case, the VPS and the slice segment header may be indicated as shown in the following Tables 4 and 5, respectively.

TABLE 4

| vps_extension2( ){ | Descriptor |
|---|---|
| ... | |
| cp_precision | ue(v) |
| for(i=1;i < NumViews; i++){ | |
| cp_present_flag[i] | u(1) |
| if(cp_present_flag[i]){ | |
| cp_in_slice_segment_header_flag[i] | u(1) |
| for(j=0;j < i;j++){ | |
| vps_cp_scale[i][j] | se(v) |
| vps_cp_off[i][j] | se(v) |
| vps_cp_inv_scale_plus_scale[i][j] | se(v) |
| vps_cp_inv_off_plus_off[i][j] | se(v) |
| } | |
| } | |
| } | |
| ... | |
| } | |

Herein, vps_cp_scale[i][j], vps_cp_off[i][j], vps_cp_inv_scale_plus_scale[i][j], and vps_cp_inv_off_plus_off[i][j] specify a (default) parameter for converting a depth value into a disparity value. If a texture layer and a depth layer having ViewIdx equal to i are both present, the parameter is associated with the texture layer.

In this case, a current camera parameter may be represented as CpScale[i][j], CpOff[i][j], CpInvScalePlusScale[i][j], and CpInvOffPlusOff[i][j].

CpScale[i][j], CpOff[i][j], CpInvScalePlusScale[i][j], and CpInvOffPlusOff[i][j] may be applied as follows.

CpScale[i][j]=vps_cp_scale[i][j]
CpOff[i][j]=vps_cp_off[i][j]
CpInvScalePlusScale[i][j]=vps_cp_inv_scale_plus_scale[i][j]
CpInvOffPlusOff[i][j]=CpInvOffPlusOff[i][j]

TABLE 5

| slice_segment_header( ) { | Descriptor |
|---|---|
| ... | |
| if(nuh_layer_id > 0 && | |
| cp_in_slice_segment_header_flag[ViewIdx]) | |
| cu_update_flag[ViewIdx] | u(1) |
| if(cu_update_flag[ViewIdx]) | |
| for(j=0;j < ViewIdx;j++){ | |
| cp_scale[j] | se(v) |
| cp_off[j] | se(v) |
| cp_inv_scale_plus_scale[j] | se(v) |
| cp_inv_off_plus_off[j] | se(v) |
| } | |
| ... | |
| } | |

Herein, cu_update_flag is flag information indicating whether a camera parameter is updated.

A value of cu_update_flag[ViewIdx] equal to 1 specifies that syntax elements cp_scale[j], cp_off[j], cp_inv_scale_plus_scale[j], and cp_inv_off_plus_off[j] are present in a slice segment header.

A value of cu_update_flag[ViewIdx] equal to 0 specifies that cp_scale[j], cp_off[j], cp_inv_scale_plus_scale[j], and cp_inv_off_plus_off[j] are not present in the slice segment header, and cp_scale[j], cp_off[j], cp_inv_scale_plus_scale[j], and cp_inv_off_plus_off[j] are derived from syntax elements corresponding to a previous slice segment header.

If cu_update_flag[ViewIdx] is not present, a value of cu_update_flag[ViewIdx] may be inferred to be equal to 0. If a picture on an access unit with nuh_layer_id equal to 0 is an intra random access point (IRAP) picture, a value of cu_update_flag[ViewIdx] in the slice segment header may be equal to 0.

cp_scale[j], cp_off[j], cp_inv_scale_plus_scale[j], and cp_inv_off_plus_off[j] specify parameters for converting a depth value into a disparity value. Herein, if ViewIdxA is equal to ViewIdxB, cp_scale[j], cp_off[j], cp_inv_scale_plus_scale[j], and cp_inv_off_plus_off[j] in a slice segment header having ViewIdx equal to ViewIdxA are equal to cp_scale[j], cp_off[j], cp_inv_scale_plus_scale[j], and cp_inv_off_plus_off[j] in a slice segment header having ViewIdx equal to ViewIdxB.

If a value of cu_update_flag[ViewIdx] is equal to 1, CpScale[i][j], CpOff[i][j], CpInvScalePlusScale[i][j], and CpInvOffPlusOff[i][j] may be updated as follows.

CpScale[ViewIdx][j]=cp_scale[j]
CpOff[ViewIdx][j]=cp_off[j]
CpInvScalePlusScale[ViewIdx][j]=cp_inv_scale_plus_scale[j]
CpInvOffPlusOff[ViewIdx]=cp_inv_off_plus_off[j]

If the current camera parameters are represented as CpScale, CpOff, CpInvScalePlusScale, and CpInvOffPlusOff as described above, the scale factor in the backward conversion in the aforementioned Equation 2 may be derived on the basis of CpScale, and the offset may be derived on the basis of CpOff. Further, the scaling factor in the forward conversion may be derived on the basis of CpInvScalePlusScale and the offset may be derived on the basis of CpInvOffPlusOff.

For another embodiment, the default camera parameter is transmitted through VPS, and flag information indicating whether the camera parameter is updated through the slice segment header is transmitted, and if the camera parameter is updated in this case, a differential value with respect to the default camera parameter may be transmitted. If the flag information indicates 0, the camera parameter is not included in the slice segment header, and a camera parameter of a current time instance and stored in the decoding device is used. That is, if the camera parameter is not updated even once, the default camera parameter will be stored in the decoding device. If the camera parameter is updated and thus the flag information indicates 1, the decoding device parses a camera parameter differential value included in the slice segment header to add it to the default camera parameter, and thus updates the camera parameter shared for the current time instance. In this case, if a picture which is currently being decoded is a random access point, the camera parameter may be parsed unconditionally.

In this case, the VPS and the slice segment header may be indicated as shown in the following Tables 6 and 7, respectively.

TABLE 6

| vps_extension2( ){ | Descriptor |
|---|---|
| ... | |
| cp_precision | ue(v) |
| for(i=1;i < NumViews; i++){ | |

TABLE 6-continued

| vps_extension2( ){ | Descriptor |
|---|---|
| cp_present_flag[i] | u(1) |
| if(cp_present_flag[i]){ | |
| cp_in_slice_segment_header_flag[i] | u(1) |
| for(j=0;j < i;j++){ | |
| vps_cp_scale[i][j] | se(v) |
| vps_cp_off[i][j] | se(v) |
| vps_cp_inv_scale_plus_scale[i][j] | se(v) |
| vps_cp_inv_off_plus_off[i][j] | se(v) |
| } | |
| } | |
| } | |
| ... | |
| } | |

Herein, vps_cp_scale[i][j], vps_cp_off[i][j], vps_cp_inv_scale_plus_scale[i][j], and vps_cp_inv_off_plus_off[i][j] specify a (default) parameter for converting a depth value into a disparity value. If a texture layer and a depth layer having ViewIdx equal to i are both present, the parameter is associated with the texture layer.

In this case, a current camera parameter may be represented as CpScale[i][j], CpOff[i][j], CpInvScalePlusScale[i][j], and CpInvOffPlusOff[i][j].

CpScale[i][j], CpOff[i][j], CpInvScalePlusScale[i][j], and CpInvOffPlusOff[i][j] may be applied as follows.
  CpScale[i][j]=vps_cp_scale[i][j]
  CpOff[i][j]=vps_cp_off[i][j]
  CpInvScalePlusScale[i][j]=vps_cp_inv_scale_plus_scale[i][j]
  CpInvOffPlusOff[i][j]=vps_cp_inv_off_plus_off[i][j]

TABLE 7

| slice_segment_header( ) { | Descriptor |
|---|---|
| ... | |
| if(nuh_layer_id > 0 && | |
| cp_in_slice_segment_header_flag[ViewIdx]) | |
| cu_update_flag[ViewIdx] | u(1) |
| if(cu_update_flag[ViewIdx]) | |
| for(j=0;j < ViewIdx;j++){ | |
| delta_cp_scale[j] | se(v) |
| delta_cp_off[j] | se(v) |
| delta_cp_inv_scale_plus_scale[j] | se(v) |
| delta_cp_inv_off_plus_off[j] | se(v) |
| } | |
| ... | |
| } | |

Herein, cu_update_flag is flag information indicating whether a camera parameter is updated.

A value of cu_update_flag[ViewIdx] equal to 1 specifies that syntax elements delta_cp_scale[j], delta_cp_off[j], delta_cp_inv_scale_plus_scale[j], and delta_cp_inv_off_plus_off[j] are present in the slice segment header.

A value of cu_update_flag[ViewIdx] equal to 0 specifies that delta_cp_scale[j], delta_cp_off[j], delta_cp_inv_scale_plus_scale[j], and delta_cp_inv_off_plus_off[j] are not present in the slice segment header, and delta_cp_scale[j], delta_cp_off[j], delta_cp_inv_scale_plus_scale[j], and delta_cp_inv_off_plus_off[j] are derived from syntax elements corresponding to a previous slice segment header.

If cu_update_flag[ViewIdx] is not present, a value of cu_update_flag[ViewIdx] may be inferred to be equal to 0. If a picture on an access unit with nuh_layer_id equal to 0 is an intra random access point (IRAP) picture, a value of cu_update_flag[ViewIdx] in the slice segment header may be equal to 0.

delta_cp_scale[j], delta_cp_off[j], delta_cp_inv_scale_plus_scale[j], and delta_cp_inv_off_plus_off[j] specify a parameter for converting a depth value into a disparity value. Herein, if ViewIdxA is equal to ViewIdxB, delta_cp_scale[j], delta_cp_off[j], delta_cp_inv_scale_plus_scale[j], and delta_cp_inv_off_plus_off[j] in a slice segment header having ViewIdx equal to ViewIdxA are equal to delta_cp_scale[j], delta_cp_off[j], delta_cp_inv_scale_plus_scale[j], and delta_cp_inv_off_plus_off[j] in a slice segment header having ViewIdx equal to ViewIdxB.

If a value of cu_update_flag[ViewIdx] is equal to 1, CpScale[i][j], CpOff[i][j], CpInvScalePlusScale[i][j], and CpInvOffPlusOff[i][j] may be updated as follows.
  CpScale[ViewIdx][j]=vps_cp_scale[ViewIdx][j]+delta_cp_scale[j]
  CpOff[ViewIdx][j]=vps_cp_off[ViewIdx][j]+delta_cp_off[j]
  CpInvScalePlusScale[ViewIdx][j]=vps_cp_inv_scale_plus_scale[ViewIdx][j]+cp_inv_scale_plus_scale[j]
  CpInvOffPlusOff[ViewIdx][j]=CpInvOffPlusOff[i][j]+cp_inv_off_plus_off[j]

In this case, the scale factor in the backward conversion in the aforementioned Equation 2 may be derived on the basis of CpScale, and the offset may be derived on the basis of CpOff. Further, the scaling factor in the forward conversion may be derived on the basis of CpInvScalePlusScale and the offset may be derived on the basis of CpInvOffPlusOff.

For another embodiment, only a differential value with respect to a camera parameter for a current slice is transmitted by using a camera parameter which is transmitted most recently as a predictor. In this case, in order to prevent a delta value from increasing infinitely, if an absolute value of the delta reaches a predetermined size, the camera parameter to be used as the predictor may be updated. In this case, a camera parameter to be used as a basis (or a reference) may be transmitted through a sequence parameter set (SPS) syntax, a video parameter set (VPS) syntax, or a picture parameter set (PPS) by considering a computation load and a coding efficiency.

In this case, a syntax through which the camera parameter to be used as the basis is transmitted and a slice segment header through which a camera parameter differential value is transmitted may be represented for example as shown in the following Tables 8 and 9.

TABLE 8

| sequence_parameter_set_rbsp( )(or video_parameter_set_rbsp( ), picture_parameter_set_rbsp( )){ | Descriptor |
|---|---|
| ... | |
| for(i=1;i < NumViews; i++){ | |
| cp_present_flag[i] | u(1) |
| if(cp_present_flag[i]){ | |
| for(j=0;j < i;j++){ | |
| cp_scale[i][j] | se(v) |
| cp_off[i][j] | se(v) |
| cp_inv_scale_plus_scale[i][j] | se(v) |
| cp_inv_off_plus_off[i][j] | se(v) |
| } | |
| } | |
| } | |
| ... | |
| } | |

Herein, cp_scale[i][j], cp_off[i][j], cp_inv_scale_plus_scale[i][j], and cp_inv_off_plus_off[i][j] specify a (default) parameter for converting a depth value into a disparity value. If a texture layer and a depth layer having ViewIdx equal to i are both present, the parameter is associated with the texture layer.

In this case, the reference camera parameters may be represented as RefCpScale[i][j], RefCpOff[i][j], RefCpInvScalePlusScale[i][j], and RefCpInvOffPlusOff[i][j].

RefCpScale[i][j], RefCpOff[i][j], RefCpInvScalePlusScale[i][j], and RefCpInvOffPlusOff[i][j] may be applied as follows.

RefCpScale[i][j]=cp_scale[i][j]
RefCpOff[i][j]=cp_off[i][j]
RefCpInvScalePlusScale[i][j]=cp_inv_scale_plus_scale[i][j]
RefCpInvOffPlusOff[i][j]=cp_inv_off_plus_off[i][j]

TABLE 9

| slice segment header( ) { | Descriptor |
| --- | --- |
| ... | |
| delta_cp_flag | u(1) |
| if(nuh_layer_id > 0 && delta_cp_flag) | |
| for(j=0;j < ViewIdx;j++){ | |
| delta_cp_scale[j] | se(v) |
| delta_cp_off[j] | se(v) |
| delta_cp_inv_scale_plus_scale[j] | se(v) |
| delta_cp_inv_off_plus_off[j] | se(v) |
| } | |
| ... | |
| } | |

Herein, delta_cp_flag is flag information indicating whether a differential value (or a delta value) of a camera parameter is present.

A value of delta_cp_flag equal to 1 specifies that syntax elements delta_cp_scale[j], delta_cp_off[j], delta_cp_inv_scale_plus_scale[j], and delta_cp_inv_off_plus_off[j] are present in a slice segment header. That is, this specifies that a current camera parameter is derived by adding a camera parameter differential value which is present in the slice segment header to the existing (reference) camera parameter, and the current camera parameter is used for a current slice.

If a value of cu_update_flag[ViewIdx] is equal to 0, delta_cp_scale[j], delta_cp_off[j], delta_cp_inv_scale_plus_scale[j], and delta_cp_inv_off_plus_off[j] are not present in the slice segment header. That is, this specifies that the camera parameter is not updated in this bitstream.

In this case, current camera parameters (conversion parameters) for the current slice may be represented as CurrCpScale[i][j], CurrCpOff[i][j], CurrCpInvScalePlusScale[i][j], and CurrCpInvOffPlusOff[i][j].

CurrCpScale[i][j], CurrCpOff[i][j], CurrCpInvScalePlusScale[i][j], and CurrCpInvOffPlusOff[i][j] may be derived as follows.

CurrCpScale[i][j]=RefCpScale[i][j]+delta_cp_scale[j]
CurrCpOff[i][j]=RefCpOff[i][j]+delta_cp_off[j]
CurrCpInvScalePlusScale[i][j]=RefCpInvScalePlusScale[i][j]+cp_inv_scale_plus_scale[j]
CurrCpInvOffPlusOff[i][j]=RefCpInvOffPlusOff[i][j]+cp_inv_off_plus_off[j]

If the current camera parameters are represented as CurrCpScale[i][j], CurrCpOff[i][j], CurrCpInvScalePlusScale[i][j], and CurrCpInvOffPlusOff[i][j] as described above, the scale factor in the backward conversion in the aforementioned Equation 2 may be derived on the basis of CurrCpScale[i][j], and the offset may be derived on the basis of CurrCpOff[i][j]. Further, the scaling factor in the forward conversion may be derived on the basis of CurrCpInvScalePlusScale[i][j]m and the offset may be derived on the basis of CurrCpInvOffPlusOff[i][j].

If delta_cp_scale[j], delta_cp_off[j], delta_cp_inv_scale_plus_scale[j], or delta_cp_inv_off_plus_off[j] reaches a threshold, RefCpScale[i][j], RefCpOff[i][j], RefCpInvScalePlusScale[i][j], or RefCpInvOffPlusOff[i][j] may be updated as follows. Herein, the threshold may be explicitly signaled or may be implicitly reported.

RefCpScale[i][j]=CurrCpScale[i][j]
RefCpOff[i][j]=CurrCpOff[i][j]
RefCpInvScalePlusScale[i][j]=CurrCpOff[i][j]
RefCpInvOffPlusOff[i][j]=CurrCpInvOffPlusOff[i][j]

For another embodiment, the decoding device may determine any one camera parameter set among a plurality of camera parameter sets as a reference target camera parameter set. For example, not one camera parameter set but the plurality of camera parameter sets may be transmitted from the encoder. In this case, for decoding of a current slice or picture, a camera parameter set which is the reference target may be determined by receiving index (or ID) information indicating any one camera parameter set among the plurality of camera parameter sets or by deriving it on the basis of different information. The plurality of camera parameter sets may be referenced in decoding of a plurality of slices.

Figure 5:
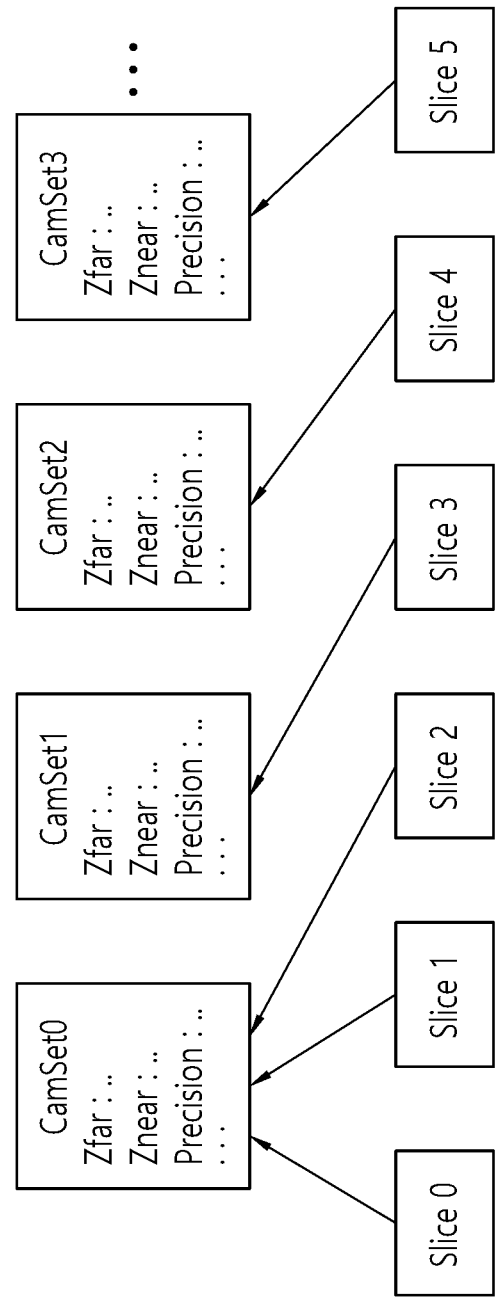
FIG. 5 illustrates an example of a reference target camera parameter set for each slice with respect to a plurality of camera parameter sets.

FIG. 5 illustrates an example of a reference target camera parameter set for each slice with respect to a plurality of camera parameter sets.

Referring to FIG. 5, a slice 0 to a slice 2 may refer to a camera parameter set 0, a slice 3 may refer to a camera parameter set 1, and a slice 4 and a slice 5 may refer to a camera parameter set 2.

The decoding device may receive the camera parameter sets from the encoding device, and on the basis of index information to be transmitted at a later time, may determine which camera parameter set is applied among a plurality of camera parameter sets with respect to a slice.

The camera parameter sets may be transmitted, for example, through PPSs. For example, the PPS may be represented as shown in the following Table 10.

TABLE 10

| pps_3d_extension( ){ | Descriptor |
| --- | --- |
| ... | |
| for(i=1;i < NumViews; i++){ | |
| cp_present_flag[i] | u(1) |
| if(cp_present_flag[i]){ | |
| for(j=0;j < i;j++){ | |
| cp_scale[i][j] | se(v) |
| cp_off[i][j] | se(v) |
| cp_inv_scale_plus_scale[i][j] | se(v) |
| cp_inv_off_plus_off[i][j] | se(v) |
| } | |
| } | |
| } | |
| ... | |
| } | |

Up to 64 different PPSs may be transmitted from the encoding device to the decoding device. The decoding device may designate a PPS having a camera parameter set to be referenced in a corresponding slice on the basis of index information (or an ID of the PPS) included in a slice segment header, and thus may find a proper camera parameter from a plurality of camera parameters and may utilize it in decoding.

In this case, the slice segment header may be represented for example by Table 11 below.

TABLE 11

| slice segment header( ) { | Descriptor |
|---|---|
| first_slice_segment_in_pic_flag | u(1) |
| if(nal_unit_type >= BLA_W_LP && | |
| nal_unit_type <= RSV_IRAP_VCL23) | |
| no_output_of_prior_pics_flag | u(1) |
| slice_pic_parameter_set_id | ue(v) |
| if(!first_slice_segement_in_pic_flag){ | |
| if(dependent_slice_segments_enabled_flag) | |
| dependent_slice_segment_flag | u(1) |
| slice_segment_address | u(v) |
| } | |
| ... | |
| } | |

Herein, slice_pic_parameter_set_id specifies index information indicating which camera parameter set is applied among a plurality of camera parameter sets in a format of an ID of PSS as to the current slice.

slice_pic_parameter_set_id specifies a value of pps_pic_parameter_set for the PPS in use, and slice_pic_parameter_set_id may be in the range of 0 to 63(inclusive).

In this case, the reference camera parameter set may include RefCpScale[i][j], RefCpOff[i][j], RefCpInvScalePlusScale[i][j], and RefCpInvOffPlusOff[i][j].

If nuh_layer_id is greater than 0, the PPS is referenced (or indicated) by slice_pic_parameter_set_id of the slice segment header, and cp_present_flag[i] included in the PPS is equal to 1, then RefCpScale[i][j], RefCpOff[i][j], RefCpInvScalePlusScale[i][j], and RefCpInvOffPlusOff[i][j] may be applied as follows.

RefCpScale[i][j]=cp_scale[i][j]
RefCpOff[i][j]=cp_off[i][j]
RefCpInvScalePlusScale[i][j]=cp_inv_scale_plus_scale[i][j]
RefCpInvOffPlusOff[i][j]=cp_inv_off_plus_off[i][j]

For another embodiment, the decoding device may select any one camera parameter set among the plurality of camera parameter sets as a default camera parameter set. In this case, for correct conversion, the selected default camera parameter set may be used in a current slice or picture by adding a differential value thereto.

For example, the decoding device may select one default camera parameter set among the plurality of camera parameter sets, and may acquire a reference camera parameter for the current slice by adding a delta value to parameters included in the selected default camera parameter set.

For example, the camera parameter sets may be transmitted through the PPS. In this case, the PPS and the slice segment header may be represented as shown in the following Table 12 and Table 13.

TABLE 12

| pps_3d_extension( ){ | Descriptor |
|---|---|
| ... | |
| for(i=1;i < NumViews; i++){ | |
| cp_present_flag[i] | u(1) |
| if(cp_present_flag[i]){ | |
| for(j=0;j < i;j++){ | |
| cp_scale[i][j] | se(v) |
| cp_off[i][j] | se(v) |
| cp_inv_scale_plus_scale[i][j] | se(v) |
| cp_inv_off_plus_off[i][j] | se(v) |
| } | |
| } | |
| } | |
| ... | |
| } | |

TABLE 13

| slice segment header( ) { | Descriptor |
|---|---|
| first_slice_segment_in_pic_flag | u(1) |
| if(nal_unit_type >= BLA_W_LP && | |
| nal_unit_type <= RSV_IRAP_VCL23) | |
| no_output_of_prior_pics_flag | u(1) |
| slice_pic_parameter_set_id | ue(v) |
| if(!first_slice_segement_in_pic_flag){ | |
| if(dependent_slice_segments_enabled_flag) | |
| dependent_slice_segment_flag | u(1) |
| slice_segment_address | u(v) |
| } | |
| ... | |
| delta_cp_flag | u(1) |
| if(nuh_layer_id > 0 && delat_cp_flag | |
| for(j=0;j < ViewIdx;j++){ | |
| delta_cp_scale[j] | se(v) |
| delta_cp_off[j] | se(v) |
| delta_cp_inv_scale_plus_scale[j] | se(v) |
| delta_cp_inv_off_plus_off[j] | se(v) |
| } | |
| ... | |
| } | |

Herein, delta_cp_flag is flag information indicating whether a differential value (or a delta value) of a camera parameter set is present.

A delta_cp_flag equal to 1 specifies that parameters in a camera parameter set transmitted through PPS (or VPS, SPS) are used for this slice by adding differential values thereto.

That is, if a value of delta_cp_flag is equal to 1, syntax elements indicating the differential values, i.e., delta_cp_scale[j], delta_cp_off[j], delta_cp_inv_scale_plus_scale[j], and delta_cp_inv_off_plus_off[j], are present in a slice segment header.

A value of delta_cp_flag equal to 0 specifies that parameters in a camera parameter set transmitted through PPS (or VPS, SPS) are not updated but are used for this slice.

delta_cp_scale[j], delta_cp_off[j], delta_cp_inv_scale_plus_scale[j], and delta_cp_inv_off_plus_off[j] specify differential values for a current slice of parameters for converting a depth value into a disparity value.

In this case, current camera parameters (conversion parameters) for the current slice may be represented as CurrCpScale[i][j], CurrCpOff[i][j], CurrCpInvScalePlusScale[i][j], and CurrCpInvOffPlusOff[i][j].

CurrCpScale[i][j], CurrCpOff[i][j], CurrCpInvScalePlusScale[i][j], and CurrCpInvOffPlusOff[i][j] may be derived as follows.

CurrCpScale[i][j]=RefCpScale[i][j]+delta_cp_scale[j]
CurrCpOff[i][j]=RefCpOff[i][j]+delta_cp_off[j]
CurrCpInvScalePlusScale[i][j]=RefCpInvScalePlusScale[i][j]+cp_inv_scale_plus_scale[j]
CurrCpInvOffPlusOff[i][j]=RefCpInvOffPlusOff[i][j]+cp_inv_off_plus_off[j]

If delta_cp_scale[j], delta_cp_off[j], delta_cp_inv_scale_plus_scale[j], or delta_cp_inv_off_plus_off[j] reaches a threshold, RefCpScale[i][j], RefCpOff[i][j], RefCpInvScalePlusScale[i][j], or RefCpInvOffPlusOff[i][j] may be updated as follows. Herein, the threshold may be explicitly signaled or may be implicitly reported.

RefCpScale[i][j]=CurrCpScale[i][j]
RefCpOff[i][j]=CurrCpOff[i][j]
RefCpInvScalePlusScale[i][j]=CurrCpOff[i][j]
RefCpInvOffPlusOff[i][j]=CurrCpInvOffPlusOff[i][j]

For another embodiment, an additional syntax may be used to transmit a camera parameter set. In this case, the syntax may be called a camera parameter set syntax or a camera conversion parameter set syntax. By using the syntax for the camera parameter set in this manner, the camera parameter set is transmitted by being included in VPS, SPS, or PPS, and thus overlapping information transmission may be avoided which may occur when transmission is performed several times. Further, in this case, an index or an ID is assigned to each camera parameter set, and thus a desired camera set may be indicated even if several camera parameter sets are received.

For example, a camera conversion parameter set syntax may be represented as shown in the following Table 14.

TABLE 14

| camera_conversion_parameter_set( ){ | Descriptor |
|---|---|
| camera_conversion_parameter_set_id | ue(v) |
| for(i=1;i < NumViews; i++){ | |
| cp_present_flag[i] | u(1) |
| if(cp_present_flag[i]){ | |
| for(j=0;j < i;j++){ | |
| cp_scale[i][j] | se(v) |
| cp_off[i][j] | se(v) |
| cp_inv_scale_plus_scale[i][j] | se(v) |
| cp_inv_off_plus_off[i][j] | se(v) |
| } | |
| } | |
| } | |
| } | |
| } | |

Herein, camera_conversion_parameter_set_id specifies a specific ID assigned to a camera (conversion) parameter set.

In this case, as disclosed in the aforementioned embodiments, a camera parameter set of a specific ID may be designated through a slice segment header. Further, parameter values of a final (or reference or current) camera parameter set for a current slice may be derived by adding a delta value (or a differential value) transmitted through a slice segment header to the designated camera parameter set.

Meanwhile, the memory of the decoding device is limited, and if the decoding device receives a plurality of camera parameter sets, some or all camera parameter sets in the memory may be deleted or arranged according to a specific condition.

First, there may be several methods for deleting the camera parameter sets in the memory. For example, the camera parameter set may be deleted on the basis of an input order. That is, when the memory is insufficient, a camera parameter set which is first input to the memory may be first deleted. For another example, a reference count of a camera parameter set may be counted during a specific count or a time period, and thereafter a camera parameter set having a minimum reference count may be deleted from the memory. For another example, information regarding the camera parameter set to be deleted by the encoding device may be transmitted to the decoding device, and the decoding device may delete the camera parameter set indicated by the information from the memory. For another example, when the camera parameter set is transmitted by being included in higher parameter sets such as PPS, SPS, VPS, or the like, a buffer management scheme of the higher parameter sets may be used.

Further, for effective indexing, the camera parameter sets may be re-arranged and used. For example, the camera parameter sets may be re-arranged in an ascending or descending order of a parameter variable (e.g., an offset) which is used as a basis of the camera parameter set. For another example, the camera parameter sets may be re-arranged in a descending or ascending order of a reference count. For another example, the decoding device may receive information regarding an order of the camera parameter sets from the encoding device, and may re-arrange the camera parameter sets on the basis of the information. For another example, when the camera parameter set is transmitted by being included in higher parameter sets such as PPS, SPS, VPS, or the like, the camera parameter sets may be re-arranged in an ascending or descending order of an ID of the higher parameter set in which the camera parameter set is included.

Figure 6:
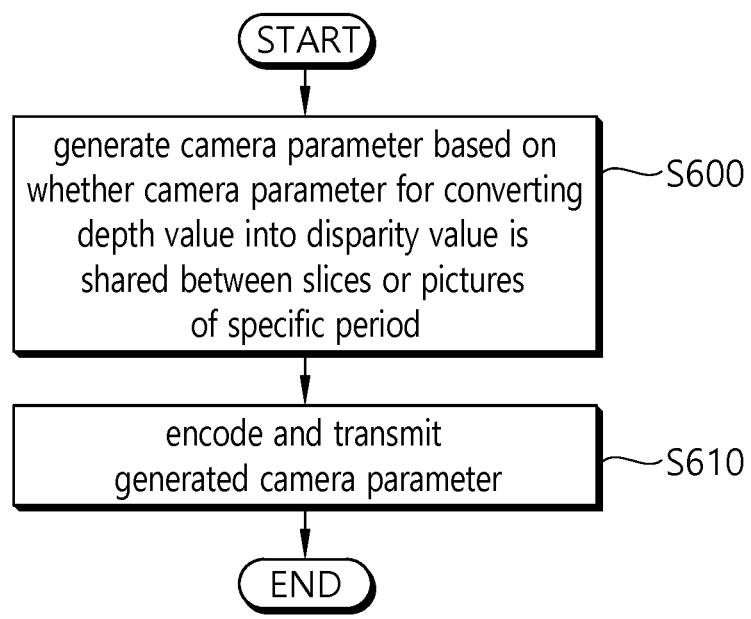
FIG. 6 is a flowchart briefly illustrating a parameter encoding method according to an embodiment of the present invention.

FIG. 6 is a flowchart briefly illustrating a parameter encoding method according to an embodiment of the present invention. The method of FIG. 6 may be performed by the aforementioned video encoding device of FIG. 2.

Referring to FIG. 6, on the basis of whether a camera parameter for converting a depth value into a disparity value is shared between slices or pictures of a specific period, an encoding device generates the camera parameter (S600). The slices or pictures of the specific period may share the camera parameter and may avoid overlapping camera parameter transmission. The camera parameter may be called a conversion parameter as described above.

The encoding device may encode the camera parameter to generate a bitstream, and may transmit it to the decoding device through a network or a storage medium (S610). The camera parameter may be represented in a syntax form. The camera parameter may be transmitted by being included, for example, in one or more of syntaxes described in the aforementioned Tables 1 to 14.

Figure 7:
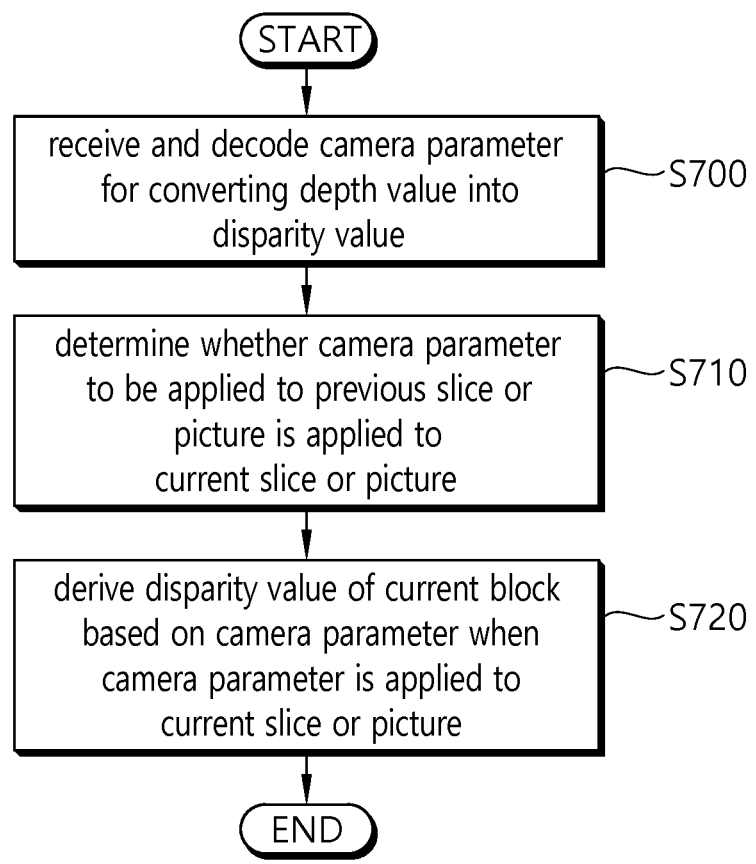
FIG. 7 is a flowchart briefly illustrating a parameter decoding method according to an embodiment of the present invention.

FIG. 7 is a flowchart briefly illustrating a parameter decoding method according to an embodiment of the present invention. The method of FIG. 7 may be performed by the aforementioned video decoding device of FIG. 3.

Referring to FIG. 7, a camera parameter for converting a depth value into a disparity value is received and decoded (S700). The decoding device may receive a bitstream and perform entropy-decoding thereon, and may acquire information regarding the video parameter. The camera parameter may be received by being included in any one of a VPS syntax, a PPS syntax, an SPS syntax, a slice segment header syntax, and a camera conversion parameter set syntax.

The decoding device determines whether the camera parameter to be applied to a previous slice or picture is applied to a current slice or picture (S710). The camera parameter may be shared by the entire video, and even if it is not shared by the entire video, may be shared for slices or pictures in a specific period according to a specific condition.

For example, if the camera parameter is used for a previous slice or picture, the decoding device may receive flag information indicating whether the camera parameter is used for a current picture through a syntax. If the flag information is 1, the camera parameter may be applied (or shared) for the current slice or the current picture. If the flag information is 0, the camera parameter may not be applied for the current picture, and a new camera parameter received by being included in the syntax may be applied for the current slice or the current picture. In this case, a syntax (a first syntax) in which the camera parameter is included and a syntax (a second syntax) in which the new camera parameter for the current slice or picture is included may be equal to each other or may be different from each other. For example, the first syntax may be a VPS syntax, and the second syntax may be a slice segment header syntax. For another example, the first syntax may be a first PPS syntax, and the second syntax may be a second PPS syntax. About 64 different PPSs may be transmitted from the encoding device to the decoding device, and in this case, the first PPS syntax and the second PPS syntax may have different IDs.

For another example, flag information indicating whether the camera parameter is updated for the current slice or the current picture may be received through the syntax. If the flag information is 0, the camera parameter may not be updated, and if the flag information is 1, the camera parameter may be updated on the basis of a parameter value received by being included in the second syntax. In this case, the updated camera parameter may be used for the current slice or picture. In this case, the parameter value may be a differential value for the camera parameter.

For another example, flag information indicating whether a differential value for the existing camera parameter is present for the current slice or the current picture may be received through the syntax. If the flag information is 0, the camera parameter may be applied for the current slice or the current picture, and if the flag information is 1, a new camera parameter derived on the basis of the camera parameter and the differential value received by being included in the syntax may be applied for the current slice or the current picture.

According to the aforementioned method, the decoding device may avoid overlapping camera parameter reception, and may share the same camera parameter for pictures (or slices) in a specific period in a view.

Meanwhile, a value of the camera parameter may be derived on the basis of at least one of cp_scale, cp_off, cp_inv_scale_plus_scale, and cp_inv_off_plus_off syntax elements.

When the camera parameter is applied to the current slice or picture, a disparity value of a current block is derived on the basis of the camera parameter (S720). The decoding device may derive the disparity value on the basis of the aforementioned Equation 2.

The decoding device may perform inter-view prediction on a corresponding block (e.g., a current block) on the basis of the disparity value to generate prediction samples of the corresponding block. The decoding device may reconstruct the corresponding block and a (current) picture on the basis of the prediction.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation, and do not intend to limit technical scopes of the present invention. Therefore, the scope of the invention should be defined by the appended claims.

When the above-described embodiments are implemented in software in the present invention, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A 3 dimensional (3D) decoding method comprising:
receiving, through a video parameter set (VPS), first flag information indicating whether a camera parameter for each slice is present in a slice segment header of the each slice of a current view or the camera parameter for the each slice is present in the VPS;
receiving, through a slice segment header of a current slice, second flag information indicating whether a camera parameter for a previous slice in the current view of a same access unit (AU) as the current slice is used for a camera parameter for the current slice when the first flag information indicates that the camera parameter for the each slice is present in the slice segment header of the each slice of the current view;
determining whether the camera parameter for the previous slice is used for the camera parameter for the current slice based on the second flag information;
deriving a disparity value for a current block of the current slice based on the camera parameter for the current slice when the camera parameter for the previous slice is used for the camera parameter for the current slice;
generating prediction samples of the current block by performing inter-view prediction on the current block based on the disparity value; and
reconstructing a current picture comprising the current block based on the generated prediction samples,
wherein the previous slice is spatially adjacent to the current slice, and
wherein the camera parameter for the previous slice is used for the camera parameter for the current slice when the second flag information is 1, and a new camera parameter for the current slice is received by being included in the slice segment header of the current slice when the second flag information is 0.

2. The 3D decoding method of claim 1, further comprising receiving, through the slice segment header of the current slice, third flag information indicating whether the camera parameter for the previous slice is updated for the current slice,
wherein if the third flag information is 0, the camera parameter for the previous slice is not updated but is used for the camera parameter for the current slice, and
wherein if the third flag information is 1, the camera parameter for the previous slice is updated based on parameter value received by being included in the slice segment header of the current slice, and the updated camera parameter is used for the camera parameter for the current slice.

3. The 3D decoding method of claim 2, wherein the parameter value received by being included in the slice segment header of the current slice is a differential value for the camera parameter for the previous slice.

4. The 3D decoding method of claim 1, further comprising receiving, through the slice segment header of the current slice, fourth flag information indicating whether a differential value for the camera parameter for the previous slice is present for the current slice,
wherein if the fourth flag information is 0, the camera parameter for the previous slice is used for the camera parameter for the current slice, and if the fourth flag information is 1, a new camera parameter derived based on the camera parameter for the previous slice and the differential value received by being included in the slice segment header of the current slice is used for the camera parameter for the current slice.

5. The 3D decoding method of claim 1, wherein a value of the camera parameter for the previous slice or the current slice is derived based on at least one of cp_scale, cp_off, cp_inv_scale_plus_scale, and cp_inv_off_plus_off syntax elements for the previous slice or the current slice.

6. The 3D decoding method of claim 5, wherein the disparity value is calculated based on the following equation:

$$dv = (s*v+o) \gg n,$$

wherein dv is the disparity value, s is a scale factor, v is a depth sample value, o is an offset, n is a shift parameter, and wherein the scale factor is determined based on a value of the cp_scale syntax element or a value of the cp_in-v_off_plus_off syntax element, and the offset is determined based on a value of the cp_off syntax element or a value of the cp_inv_off_plus_off syntax element.

7. The 3D decoding method of claim 6, wherein in case of backward conversion for deriving a disparity vector between a current view and a view with a view index j and having a depth sample, the scaling factor is determined based on the value of the cp_scale syntax element, and the offset is determined based on the value of the cp_off syntax element, and in case of forward conversion for deriving the disparity vector between a view with the view index j and a current view having a depth sample, the scaling factor is determined based on the value of the cp_inv_scale_plus_scale syntax element, and the offset is determined based on the value of the cp_inv_off_plus_off syntax element.

8. The 3D decoding method of claim 1, wherein the first flag information is signaled by cp_in_slice_segment_header_flag syntax element, and the second flag information is signaled by prev_cp_in_slice_segment_header_flag syntax element.

9. The 3D decoding method of claim 2, wherein the third flag information is signaled by cp_update_flag syntax element.

10. The 3D decoding method of claim 4, wherein the fourth flag information is signaled by delta_cp_flag syntax element.

11. The 3D decoding method of claim 1, the deriving the disparity value for the current block of the current slice comprises converting a depth value for the current block of the current slice into the disparity value for the current block of the current slice based on the camera parameter for the current slice.

12. The 3D decoding method of claim 1, the determining whether the camera parameter for the previous slice is used for the camera parameter for the current slice comprises receiving the new camera parameter for the current slice comprised in the slice segment header of the current slice when the current picture is an Intra Random Access Point (IRAP) picture.

13. The 3D decoding method of claim 12, wherein the second flag information is 0 when the current picture is the IRAP picture.

14. A 3 dimensional (3D) decoding apparatus comprising:
an entropy decoder configured to:
receive, through a video parameter set (VPS), first flag information indicating whether a camera parameter for each slice is present in a slice segment header of the each slice of a current view or the camera parameter for the each slice is present in the VPS,
receive, through a slice segment header of a current slice, second flag information indicating whether a camera parameter for a previous slice in the current view of a same access unit (AU) as the current slice is used for a camera parameter for the current slice when the first flag information indicates that the camera parameter for the each slice is present in the slice segment header of the each slice of the current view, and
determine whether the camera parameter for the previous slice is used for the camera parameter for the current slice based on the second flag information;
a predictor configured to derive a disparity value for a current block of the current slice based on the camera parameter for the current slice when the camera parameter for the previous slice is used for the camera parameter for the current slice, and generate prediction samples of the current block by performing inter-view prediction on the current block based on the disparity value; and
a reconstructor configured to reconstruct a current picture comprising the current block based on the generated prediction samples, wherein the previous slice is spatially adjacent to the current slice, and
wherein the camera parameter for the previous slice is used for the camera parameter
for the current slice when the second flag information is 1, and a new camera parameter for the current slice is received by being included in the slice segment header of the current slice when the second flag information is 0.

15. The 3D decoding apparatus of claim 14, the entropy decoder is further configured to receive, through the slice segment header of the current slice, third flag information indicating whether the camera parameter for the previous slice is updated for the current slice,
wherein if the third flag information is 0, the camera parameter for the previous slice is not updated but is used for the camera parameter for the current slice, and
wherein if the third flag information is 1, the camera parameter for the previous slice is updated based on parameter value received by being included in the slice segment header of the current slice, and the updated camera parameter is used for the camera parameter for the current slice.

16. The 3D decoding apparatus of claim 15, wherein the parameter value received by being included in the slice segment header of the current slice is a differential value for the camera parameter for the previous slice.

17. The 3D decoding apparatus of claim 14, the entropy decoder is further configured to receive, through the slice segment header of the current slice, fourth flag information indicating whether a differential value for the camera parameter for the previous slice is present for the current slice,
wherein if the fourth flag information is 0, the camera parameter for the previous slice is used for the camera parameter for the current slice, and if the fourth flag information is 1, a new camera parameter derived based on the camera parameter for the previous slice and the differential value received by being included in the slice segment header of the current slice is used for the camera parameter for the current slice.

18. The 3D decoding apparatus of claim 14, wherein a value of the camera parameter for the previous slice or the current slice is derived based on at least one of cp_scale, cp_off, cp_inv_scale_plus_scale, and cp_inv_off_plus_off syntax elements for the previous slice or the current slice.

19. The 3D decoding apparatus of claim 18, wherein the disparity value is calculated based on the following equation:

$$dv=(s*v+o)>>n,$$

wherein dv is the disparity value, s is a scale factor, v is a depth sample value, o is an offset, n is a shift parameter, and wherein the scale factor is determined based on a value of the cp_scale syntax element or a value of the cp_in-v_off_plus_off syntax element, and the offset is determined based on a value of the cp_off syntax element or a value of the cp_inv_off_plus_off syntax element.

* * * * *